United States Patent
Frank et al.

(10) Patent No.: US 10,105,934 B2
(45) Date of Patent: Oct. 23, 2018

(54) USE OF PLASTICIZER-FREE POLYVINYLACETAL FOR LAMINATING SHEETS OF POLYCARBONATE

(71) Applicant: KURARAY EUROPE GMBH, Hattersheim (DE)

(72) Inventors: Michael Frank, Hattersheim (DE); Thomas Sabel, Hattersheim (DE); Florian Mummy, Hattersheim (DE); Niklas Steinbach, Hattersheim (DE)

(73) Assignee: KURARAY EUROPE GMBH, Hattersheim (DE)

( * ) Notice: Subject to any disclaimer, the term of this patent is extended or adjusted under 35 U.S.C. 154(b) by 0 days.

(21) Appl. No.: 15/647,619

(22) Filed: Jul. 12, 2017

(65) Prior Publication Data
US 2018/0050520 A1 Feb. 22, 2018

(30) Foreign Application Priority Data
Aug. 19, 2016 (EP) .................... 16184830

(51) Int. Cl.
| B32B 17/10 | (2006.01) |
| C08K 5/103 | (2006.01) |
| B32B 7/12 | (2006.01) |
| B32B 27/08 | (2006.01) |
| B32B 27/22 | (2006.01) |
| B32B 27/30 | (2006.01) |

(Continued)

(52) U.S. Cl.
CPC ......... *B32B 17/10761* (2013.01); *B32B 7/12* (2013.01); *B32B 17/10816* (2013.01); *B32B 27/08* (2013.01); *B32B 27/22* (2013.01); *B32B 27/30* (2013.01); *B32B 27/306* (2013.01); *B32B 27/365* (2013.01); *C08K 5/103* (2013.01); *B32B 37/06* (2013.01); *B32B 37/12* (2013.01); *B32B 37/1284* (2013.01); *B32B 2250/03* (2013.01); *B32B 2250/24* (2013.01); *B32B 2250/40* (2013.01); *B32B 2307/412* (2013.01); *B32B 2307/542* (2013.01); *B32B 2307/70* (2013.01); *B32B 2307/732* (2013.01); *B32B 2309/02* (2013.01); *B32B 2309/105* (2013.01); *B32B 2605/006* (2013.01)

(58) Field of Classification Search
CPC ....................................................... B32B 7/12
See application file for complete search history.

(56) References Cited

U.S. PATENT DOCUMENTS

| 4,537,828 A * | 8/1985 | Gomez | B32B 17/10009 252/1 |
| 5,332,774 A * | 7/1994 | Klang | B32B 17/10761 524/377 |
| 2013/0022825 A1 | 1/2013 | Meise et al. | |

FOREIGN PATENT DOCUMENTS

| DE | 10 2014 211 920 A1 | 12/2015 |
| EP | 0 228 718 A1 | 7/1987 |
| WO | 2013/124147 A1 | 8/2013 |

OTHER PUBLICATIONS

European Search Report, EP Application No. 16184830, dated Feb. 21, 2017, 2 pages.

\* cited by examiner

*Primary Examiner* — Daniel H Lee
(74) *Attorney, Agent, or Firm* — Brooks Kushman P.C.

(57) ABSTRACT

At least one polycarbonate sheet is laminated to at least one further rigid layer by at least one adhesion layer, characterized in that the adhesive layer consists of polyvinyl acetal having a content of vinylacetate groups of more than 10 wt. % but less than 25 wt. % and a content of plasticizer of less than 10 wt. %.

20 Claims, 2 Drawing Sheets

(51) Int. Cl.
*B32B 27/36* (2006.01)
*B32B 37/06* (2006.01)
*B32B 37/12* (2006.01)

USE OF PLASTICIZER-FREE POLYVINYLACETAL FOR LAMINATING SHEETS OF POLYCARBONATE

CROSS-REFERENCE TO RELATED APPLICATIONS

This application claims priority to European Patent Application No. 16184830.4 filed Aug. 19, 2016, the disclosure of which is incorporated in its entirety by reference herein.

BACKGROUND OF THE INVENTION

1. Field of the Invention

Films comprising polyvinylacetals have long been employed as adhesive layers for laminating glass, polymers or fibres. Plasticized polyvinylacetal films are especially used as an adhesive layer for glass-glass laminates in automotive use.

2. Background Art

Polyvinylacetal films usually contain between 15 and 30 wt.-% of plasticizer, for example as disclosed by U.S. 2013/022825 A1. For use with polycarbonate layers, plasticized films are unsuitable, since plasticizer migrates into the polycarbonate, which alters the mechanical stability and optical properties of the polycarbonate sheet.

Plasticizer-free films from polyvinylacetal are known as adhesive layers for non-woven fabrics. For example, WO 2013124147A1 discloses the use of plasticizer-free films for laminating layers of aromatic polyamide fibers.

Reducing the weight of laminated glass is a long-standing issue, especially in the automotive industry. Several attempts have been made to replace mineral glass by optically clear polymers, but due to safety regulations, and the lack of optical and mechanical stability, the use of polycarbonate layers as a replacement for mineral glass is limited to but few applications. In this regard, U.S. Pat. No. 4,537,828 describes polyvinylacetal films with low plasticizer content as an adhesive layer for polycarbonate sheets.

SUMMARY OF THE INVENTION

An object of the invention was therefore to provide a process for producing optically clear laminates from polycarbonates with the use of polyvinylacetal having a low content of plasticizer as an adhesive layer. It has now surprisingly been found that a polyvinylacetal film with a low plasticizer content is suitable as an adhesive layer for polycarbonate sheets to obtain an optically clear laminate.

DETAILED DESCRIPTION OF THE PREFERRED EMBODIMENTS

Figure 1:
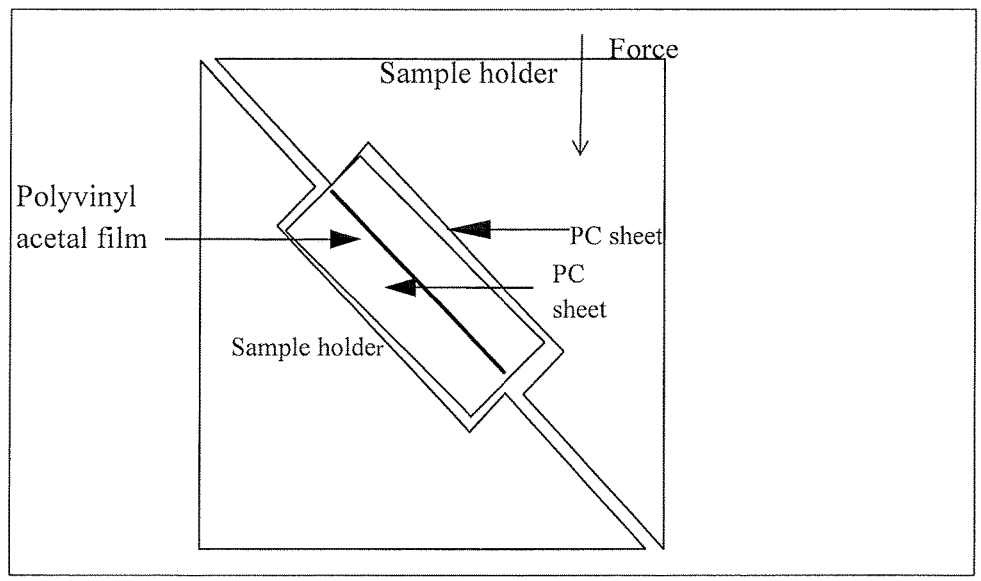
FIG. 1 illustrates a shear test for laminates.

The invention is therefore directed to a process for laminating at least one polycarbonate sheet with at least one rigid layer by at least one adhesion layer characterized in that the adhesive layer consists of polyvinylacetal having a content of vinylacetate groups between 10 and 25 wt. % and a content of plasticizer of less than 10 wt. %. The process according to the invention is preferably performed at temperatures of less than 125° C.

The rigid layer may, for example, be a glass sheet or another polycarbonate sheet. Preferably, the process is directed to laminating two polycarbonate sheets with the adhesive layer.

The adhesive layer of polyvinyl acetal preferably exhibits a thickness between 10 and 300 µm, more preferably between 30 and 250 µm, and most preferably between 50 and 120 µm.

The term, "polyvinylacetal" refers to any product obtained by acetalization of polyvinyl alcohol with one or more aliphatic aldehydes, especially to polyvinylbutyral.

Polyvinylacetals used in this invention may be defined by their chemical composition. For example, the polyvinyl acetate content may be between 14 wt. % and 18 wt. % and/or the polyvinyl alcohol content between 10 and 35 wt. %, preferably 11 to 27 wt. % and in particular 16 to 21 wt. %, and/or the degree of acetalization may be between 60-80 wt. %.

Suitable polyvinylacetals have a molecular weight sufficiently high to form self-supporting films either by extrusion or by a solvent casting process. A suitable molecular weight, expressed by viscosity, ranges from 5 mPas to 3000 mPas, preferably between 5 mPas to 2500 mPas, and in particular 5 to 2000 mPas, most preferably 20 to 300 mPas. Measurement of the viscosity is done with a rolling ball viscometer by Höppler according to DIN 53015:2001-02. The polymers are dissolved in ethanol containing 5% of water, at a concentration of 10 wt. % to measure the viscosity. Measurement temperature was 20° C.

Suitable polyvinylacetal resins and films thereof are available under the tradenames Mowital or Pioloform from Kuraray Europe GmbH. Suitable grades for production of film are, for example, Mowital B 30 H, Mowital B 45 H, Mowital B 60 H, Mowital BX 860 and Mowital B 75H.

The polyvinylacetal foil (also referred to as "film" in the course of the present invention) used in the present invention is manufactured by extrusion, for example with a blown film extrusion line, or preferably by a cast extrusion process using a flat film die and chill roll since then the shrinkage values are very low. Processing temperatures for the extrusion line are between 200 and 250° C. The film thickness is dedicated to the up-take speed of the cast film line and should to be arranged until the needed film thickness is achieved.

The polyvinylacetal films used in the present invention preferably contain 0.0 to 10 wt. %, more preferably 0 to 5 wt. % of plasticizer. Most preferably, the films contain no plasticizer (0 wt.-%). Plasticizers commonly used are aliphatic diesters of tri or tetraethylene glycols, especially triethyleneglycol-bis-2-ethylhexanoate (3G8). Also used are dialkyl adipates with aliphatic or cycloaliphatic ester moieties such as dihexyladipate, dialkylsebacate, triorgano phosphates, triorgano phosphites or phthalate based plasticizer such as benzyl butyl phthalate or the hydrogenated products thereof like diisononylcyclohexyldicarboxylic acid (DINCH).

The polyvinylacetal films used in the present invention may additionally contain up to 10 wt. %, preferably less than 2 wt. % of additives, especially less than 0.5% wt. % of additives. As additives, inorganic fillers such as pigments, dyes or clays or UV stabilizers or oxidation stabilizers may be used. Plasticizers and water are not considered as additives in this respect.

Suitable UV stabilizers may be amine based, for example tetramethyl piperidine. Next to primary, secondary and tertiary linear amines, sterically hindered amines known as 'HALS' products may be employed as a co-stabilizer in connection with polynuclear phenolic compounds.

EXAMPLES

Thin films of PVB with a composition as follows were laminated between two sheets of polycarbonate (PC).

PVB 1: PVOH content: 18.5 wt. %, PVOAc content: 2.0 wt. %, viscosity: 83.5 mPas

PVB 2: PVOH content: 18.6 wt. %, PVOAc content: 1.8 wt. %, viscosity: 201.0 mPas PVB 3: PVOH content: 18.8 wt. %, PVOAc content: 15.5 wt. %, viscosity: 129.3 mPas In order to compare the features of the laminate according to the invention all laminates were processed in the same way and all PVB films have a thickness of about 75 µm. Conditions for lamination were adopted from standard materials for PC lamination, like TPU (thermoplastic polyurethane) or EVA (ethylene co vinyl acetate). Therefore, lamination temperature was set to 90° C. to avoid softening of the polycarbonate, and pressure was set not to exceed 10 bar to prevent substrate distortion.

Test specimens of PVB laminates 2.5×2.5 cm in size were evaluated in terms of adhesion properties using compressive shear test.

Figure 2:
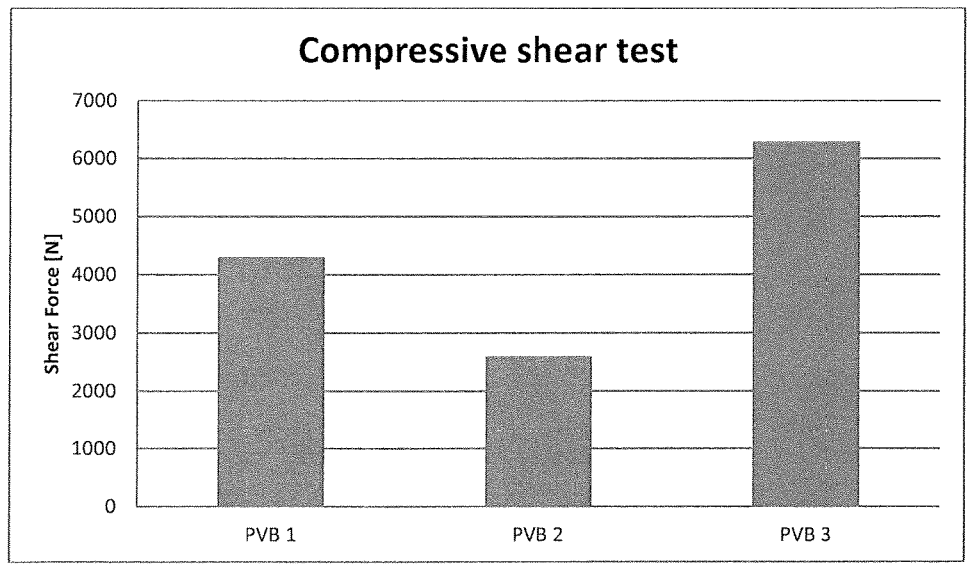
FIG. 2 illustrates compressive shear strength of laminates.

As shown in FIG. 2, a laminate based on two sheet of PC (each 2 mm thick) and a thin PVB film (here called PVB 3), even when the laminate is processed under mild conditions (low pressure (10 bar) and low temperature (90° C.)) reaches a high shear force with an average of 6.300 Newton (=10 N/mm$^2$). Surprisingly, some laminates made from PVB 3 showed separation forces of even more than 16 N/mm$^2$, which is the value where PC is distorted.

Standard PVB film (here: PVB 1 and PVB 2) consisting of polyvinyl acetal with a content of acetate groups of less than 5 wt. % always showed lower shear rates than PVB 3. For these films higher lamination temperatures are needed for higher adhesion.

Accordingly, a PVB film (example: PVB 3) consisting of polyvinyl acetal with the claimed content of vinylacetate groups (10-25 wt. %) has a higher shear rate than PVB with a standard content of acetate groups (standard here means: 0-5 wt. %).

Figure 3:
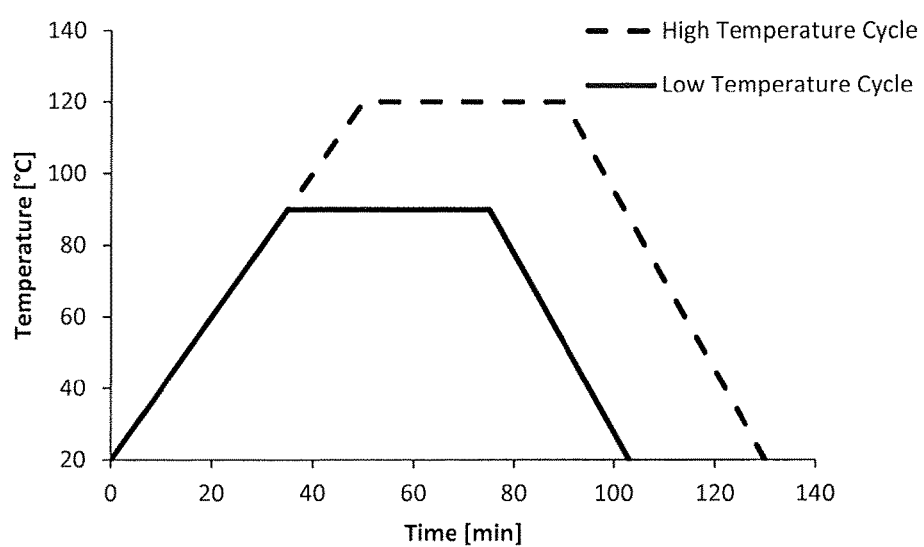
FIG. 3 illustrates a reduction in cycle time achievable by one embodiment of the invention.

To reach the same shear forces as PVB 3, PVB 1 and PVB 2 had to be laminated at a temperature of at least 120° C. This high temperature resulted in some cases in distortion of the polycarbonate sheets and is hence not technically viable. A lower maximum temperature during lamination has also commercial advantages. FIG. 3 shows typical lamination cycles to produce a laminate of two polycarbonate sheets and an adhesive layer consisting of a polyvinylacetal. For a given heating rate, cooling rate and hold time the total lamination cycle time is approximately 25 minutes shorter if the lamination temperature can be lowered from 120° C. (130 minutes cycle time) to 90° C. (105 minutes cycle time). This results in a higher productivity of the lamination process. Furthermore, the energy consumption of the process is lowered because 30° C. worth of additional heating is no longer required.

Shear Test:

As shown in FIG. 1, the laminates were sheared at an angle of 45°. The shear force is applied on the upper lower sample holder, whereas the lower sample holder is movable in the lateral direction.

Sample size 2.54·2.54 cm with a thickness of the PC sheet of 2 mm and a thickness of the PVB film of 75 µm. The shear force is applied at 2 mm/min.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for laminating at least one polycarbonate sheet with at least one rigid layer, comprising:
   laminating with at least one adhesive layer of polyvinylacetal having a content of vinylacetate groups between 10 and 25 wt. % and a content of plasticizer of less than 5 wt. %.

2. The process of claim 1, wherein the polyvinylacetal has a viscosity of 5 mPas to 3000 mPas, measured according to DIN 53015:2001-0.

3. The process of claim 1, wherein the polyvinylacetal has a degree of acetalization of 60-80 wt. %.

4. The process of claim 3, wherein the polyvinylacetal has a content of vinyl alcohol groups of 10-35 wt. %.

5. The process of claim 1, wherein the plasticizer is present, and is selected from the group consisting of aliphatic diesters of tri- or tetraethylene glycols, dialkyl adipates, triorganophosphates, triorganophosphites, phthalates, diisononylcyclohexyl dicarboxylic acid (DINCH), and mixtures thereof.

6. The process of claim 5, wherein the polyvinylacetal has a content of vinyl alcohol groups of 10-35 wt. %.

7. The process of claim 1, wherein the polyvinylacetal has a content of vinyl alcohol groups of 10-35 wt. %.

8. The process of claim 1, wherein the adhesive layer contains no plasticizer.

9. The process of claim 1, wherein lamination is performed at temperatures of less than 125° C.

10. The process of claim 1, wherein polyvinylbutyral is employed as a polyvinylacetal.

11. The process of claim 1, wherein the adhesive layer is applied in the form of a sheet having a thickness of 10-300 µm.

12. A process for laminating at least one polycarbonate sheet with at least one rigid layer, comprising:
    laminating with at least one adhesive layer of polyvinylacetal having a content of vinylacetate groups between 14 and 25 wt. % based on the weight of the polyvinylacetal, and a content of plasticizer of less than 10 wt. %.

13. The process of claim 12, wherein the plasticizer content is less than 5 wt. % based on the weight of the adhesive layer.

14. The process of claim 12, wherein the polyvinylacetal consists of polyvinyl butyral.

15. The process of claim 12, wherein lamination is performed at temperatures of less than 125° C.

16. The process of claim 12, wherein the plasticizer is present, and is selected from the group consisting of aliphatic diesters of tri- or tetraethylene glycols, dialkyl adipates, triorganophosphates, triorganophosphites, phthalates, diisononylcyclohexyl dicarboxylic acid (DINCH), and mixtures thereof.

17. The process of claim 12, wherein the adhesive layer contains no plasticizer.

18. A process for laminating at least one polycarbonate sheet with at least one rigid layer, comprising:

laminating with at least one adhesive layer of polyvinylbutyral having a content of vinylacetate groups between 10 and 25 wt. % and a content of plasticizer of less than 5 wt. %.

19. The process of claim 18, wherein the polyvinyl acetate content of the polyvinylbutyral is from 14 to 25 wt. %.

20. The process of claim 18, wherein the plasticizer is present, and is selected from the group consisting of aliphatic diesters of tri- or tetraethylene glycols, dialkyl adipates, triorganophosphates, triorganophosphites, phthalates, diisononylcyclohexyl dicarboxylic acid (DINCH), and mixtures thereof.

* * * * *